United States Patent
Browne et al.

(10) Patent No.: US 7,498,926 B2
(45) Date of Patent: Mar. 3, 2009

(54) REVERSIBLY OPENING AND CLOSING A GRILLE USING ACTIVE MATERIALS

(75) Inventors: Alan L. Browne, Grosse Pointe, MI (US); Nancy L. Johnson, Northville, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/740,949

(22) Filed: Apr. 27, 2007

(65) Prior Publication Data

US 2008/0133090 A1 Jun. 5, 2008

Related U.S. Application Data

(60) Provisional application No. 60/796,421, filed on May 1, 2006.

(51) Int. Cl.
*B60Q 1/00* (2006.01)
(52) U.S. Cl. .............. 340/425.5; 123/41.06; 123/41.58; 180/68.1; 236/35.3; 340/438
(58) Field of Classification Search ............. 340/425.5, 340/438; 123/41.06, 41.58; 701/49, 36, 701/1; 296/193.1; 180/68.1; 236/35.3
See application file for complete search history.

(56) References Cited

U.S. PATENT DOCUMENTS

| 4,410,032 A | | 10/1983 | Mori | |
|---|---|---|---|---|
| 4,534,506 A | * | 8/1985 | Ishida et al. | 236/35.3 |
| 4,753,468 A | * | 6/1988 | Szymczak et al. | 293/132 |
| 4,924,826 A | | 5/1990 | Vinson | |
| 5,732,666 A | * | 3/1998 | Lee | 123/41.05 |
| 5,735,137 A | * | 4/1998 | Kim | 62/410 |

* cited by examiner

*Primary Examiner*—Brent Swarthout (57) ABSTRACT

An active grille comprises a plurality of blades and an active material in operative communication with the blades. The active material is in operative communication with the blades and is operative to change at least one attribute in response to an activation signal, wherein fluid flow through the grille changes with the change in the at least one attribute of the active material. By way of example, in vehicle applications, the blades of a grille disposed in front of an engine compartment can be selectively positioned to provide increased airflow through the radiator due to increases in engine coolant temperature. As such, the active grille can be configured to improve vehicle fuel economy while maintaining proper engine cooling. An activation device, controller and sensors may be employed to further control the change in at least one feature of the active grille.

13 Claims, 7 Drawing Sheets

REVERSIBLY OPENING AND CLOSING A GRILLE USING ACTIVE MATERIALS

CROSS REFERENCE TO RELATED APPLICATIONS

This application relates to and claims the benefit of priority to U.S. Provisional Application No. 60/796,421 filed May 1, 2006, incorporated herein by reference in its entirety.

BACKGROUND

The present disclosure relates to an active grille and more particularly, to reversibly opening and closing blades of the grille using active materials. To effect opening and closing, the active materials are in operative communication with the blades that define the grille or form at least a portion of the blade. The active materials change at least one attribute in response to an activation signal to effect repositioning of the blades.

Airflow through a vehicle can affect many aspects of vehicle performance including vehicle drag, cooling/heat exchange for a vehicle powertrain, air conditioning systems, brakes, and the like. Reductions in vehicle drag improve fuel economy. As used herein, the term "airflow" refers to the motion of air through parts of a vehicle relative to the exterior surface of the vehicle or surfaces of elements of the vehicle along which exterior airflow can be directed such as surfaces in the engine compartment. The term "drag" refers to the resistance caused by friction in a direction opposite that of the motion of the center of gravity for a moving body in a fluid. Vehicle grilles in the art of vehicle manufacture are generally comprised of blades of a predetermined, non-adjustable geometry, location, orientation, and stiffness. Such devices generally do not adapt as driving conditions change, thus the airflow through the grille cannot be adjusted to better suit the changing driving conditions.

Accordingly, there exists a need for an adjustable exterior vehicle grille for controlling fluid flow under varying conditions such as, for example, an adjustable exterior vehicle grille for controlling airflow through the grille under varying driving conditions.

BRIEF SUMMARY

Disclosed herein are active grilles and methods of manipulating fluid flow through the active grille. In one embodiment, an active grille positioned for selectively controlling fluid flow comprises a blade pivotably mounted to a frame; and an active material in operative communication with the blade, the active material being operative to change at least one attribute in response to an activation signal, wherein the fluid flow through the grille changes with the change in the at least one attribute of the active material.

In another embodiment, a vehicle comprises an active grille positioned for selectively controlling air flow to an engine compartment, wherein the active grille comprises a plurality of blades; and an active material in operative communication with the blades, the active material being operative to change at least one attribute in response to an activation signal, wherein an airflow through the grille changes with the change in the at least one attribute of the active material.

Also included is a method of manipulating airflow through a grille formed of a plurality of blades comprising: activating an active material operatively coupled to the plurality of blades to pivotably move at least one of the plurality of blades from a first position to a second position, wherein moving from the first position to the second position changes an amount of air flowing through the grille.

The above described and other features are exemplified by the following figures and detailed description.

BRIEF DESCRIPTION OF THE DRAWINGS

Referring now to the figures, which are meant to be exemplary embodiments, and wherein the like elements are numbered alike.

DETAILED DESCRIPTION OF THE PREFERRED EMBODIMENT

The present disclosure provides an active grille wherein elements of the grille are capable of reversibly changing shape, dimension, orientation, location and/or stiffness, the change being effected through the activation of an active material, thereby allowing the grille to adapt to varying conditions and altering as well the visual appearance of the front of the grille unit and the object such as a vehicle in which it is installed. For example, for vehicle applications, selective opening and closing the elements of the active grille can vary the coefficient of aerodynamic drag. By closing the grille at high speeds, drag can be decreased and fuel economy improved. The present disclosure is not intended to be limited to any particular arena of use of an active grille such as on a vehicle, on a wall vent in a building, etc. Additionally, the present disclosure is not intended to be limited to any particular functional use of the active grille such as a styling feature, control of cooling/heating airflow, etc. Likewise, the present disclosure is not intended to be limited to any particular location of use on a vehicle such as on the front above the bumper, on the hood, on the side of the front of the vehicle in the fender region, in the roof of the vehicle, and the like.

The term "active material" as used herein generally refers to a material that exhibits a change in a property such as dimension, shape, phase, orientation, stiffness, shear strength and the like upon application of an activation signal. The active material may comprise any of a variety of active materials including, but not limited to shape memory materials, e.g., shape memory alloys, shape memory polymers, and electroactive polymers such as ionic polymer metal composites, conductive polymers, and piezoelectric material, magnetorheological (MR) compositions, such as MR elastomers, and other like materials that can exhibit a change in at least one attribute upon receiving an activation signal. Depending on the particular active material, the activation signal can take the form of, without limitation, an electric current, an electric field (voltage), a temperature change, a magnetic field, a mechanical loading or stressing, and the like. Of the above noted materials, SMA and SMP based assemblies preferably include a return mechanism to restore the original geometry of the assembly. The return mechanism can be mechanical, pneumatic, hydraulic, pyrotechnic, or based on one of the aforementioned smart materials. As will be described herein, the active exterior vehicle grille is exteriorly mounted or integrated with the vehicle to selectively control airflow therethrough. The active grille can be configured to actively sense and respond to varying driving conditions, thereby requiring no external power source, or alternatively, be configured as an actuator in operative communication with a power source to change the shape, dimension, orientation, location and/or stiffness of the blades, individually or in combination.

Figure 1:
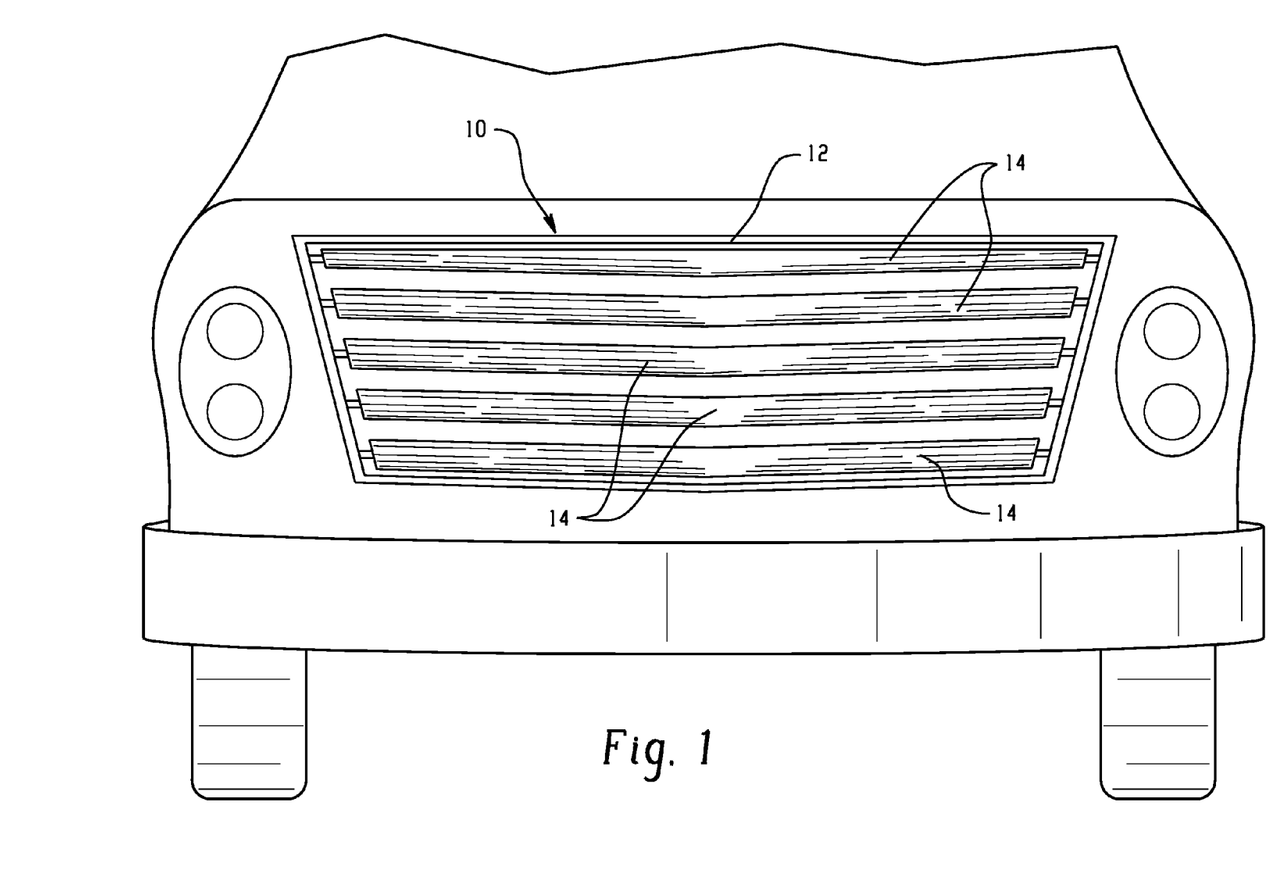
FIG. 1 is a front elevation view of an active exterior grille in a vehicle in accordance with the present disclosure.

As shown in FIG. 1, an exemplary exterior grille for a vehicle, generally indicated at reference numeral 10, comprises a frame 12, a plurality of spaced apart blades 14 pivotably mounted within the frame 12 that collectively define the grille, and an active material based actuator or material for effecting selective movement of the blades. The blades 14 can be configured to selectively open and/or close upon activation of the active material.

Figure 2:
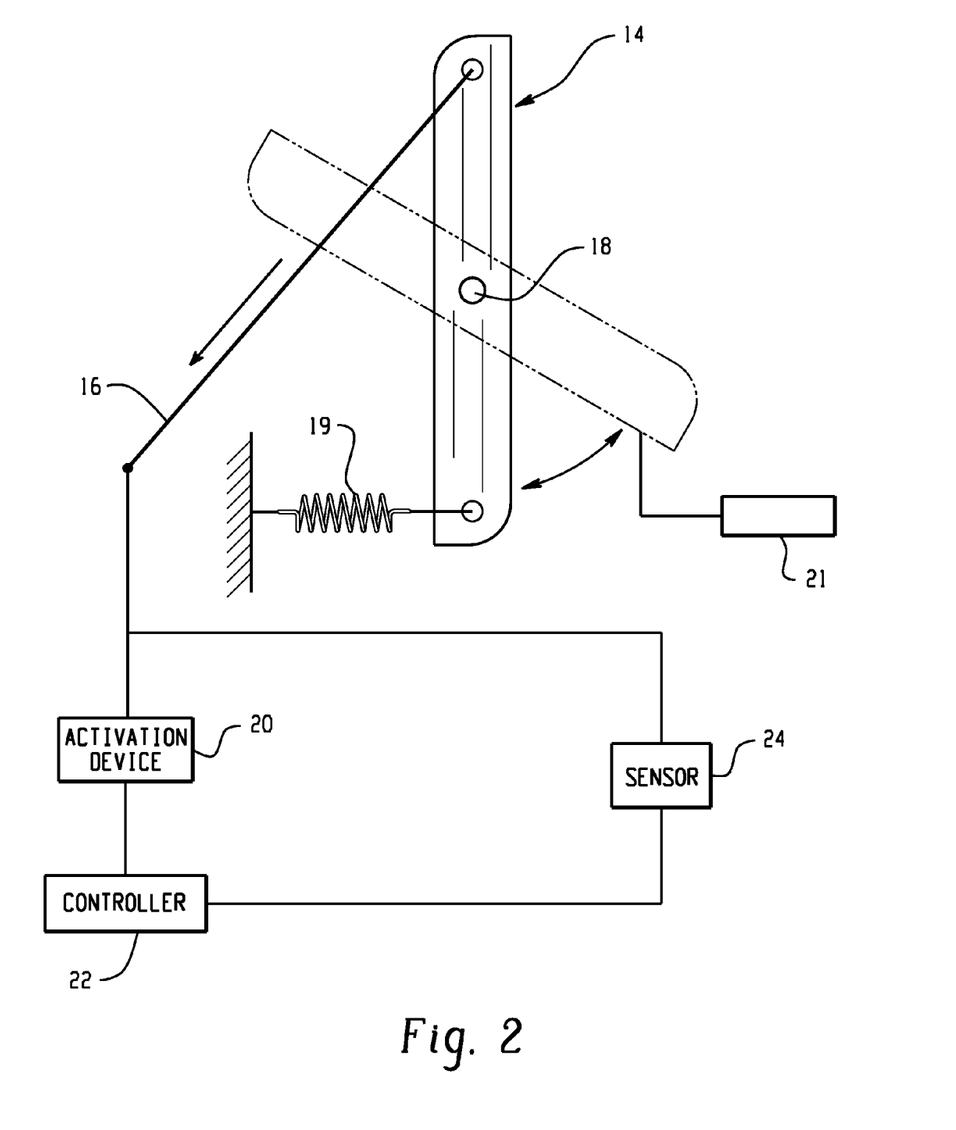
FIG. 2 schematically illustrates a system including a blade for use in the active grille, wherein positioning of the blade within the grille is with an active material based actuator.

In one embodiment shown in FIG. 2, the grille 10 includes an active material 16 in operative communication with the blade 14, the active material 16 having at least one attribute that is operative to change in response to an activation signal to the active material 16. An attribute of the active material 16, and changes thereof, refer to characteristics of the active material 16 such as, but not limited to, shape, dimension, stiffness, combinations thereof, and the like. The changes in the at least one attribute of the active material 16 affect various features of the grille 10 such as, but not limited to, shape, dimension, location, orientation, stiffness, combinations thereof, and/or the like, resulting in a change in the airflow through the grille 16. In this manner, the grille 10 is adjustable and airflow through the device 10 changes with the change in at least one attribute of the active material 16 under varying driving conditions. For example, the active material shown in FIG. 2 can be a shape memory alloy, which upon activation can be configured to contract, thereby pivoting the blade about a pivot point 18. A bias spring 19 or another active material can be used to restore the position of the blade 14. It should be noted that the blade 14 can be pivotably positioned into an unlimited number of positions depending on the magnitude of the activation signal, the particular active materials used, the actuation mechanism employed, and the like.

Coupled to and in operative communication with the blade 14 is an activation device 20. The activation device 20 is in functional communication with the active material 16, which is operable to selectively provide an activation signal to the active material and vary a position/orientation of the blades 14 by changing at least one attribute of the active material 16. For example, the active material 16 can retract (shorten its length dimension upon activation) at slow speeds to an open position and allow airflow to flow through the grille and into the engine compartment. Upon deactivation of the active material, the bias spring or the other active material can be activated to position the blades to a closed position such as may be desirable when driving at high speeds.

The activation device 20, on demand, provides the activation signal or stimulus to the active material 16 to cause the change in one or more feature of at least a portion of the grille 10. The present disclosure is not intended to be limited to any particular active material 16 and/or combinations of active materials 16. Likewise, the present disclosure is not intended to be limited to any particular activation signal. The particular activation signal will depend on the sensitivity of the active material 16. As such, the activation signal may include a thermal activation signal, magnetic activation signal, electrical activation signal, chemical activation signal, and/or other like activation signal. Moreover, the term "in response to the activation signal" is intended to include passive as well as active means for providing changes in shape, dimension, stiffness, and combinations thereof.

In one embodiment, the change in feature generally remains for the duration of the applied activation signal. Upon discontinuation of the activation signal, the active material 16 generally reverts to an unpowered form and returns substantially to the original at least one attribute, thus reverting the grille blades to their original position. In another embodiment, the change in the attributes of the active material 16 and/or feature of at least a portion of the active grille 10 may remain upon discontinuing the activation signal. In this embodiment, the active grille 10 includes a means 21 to maintain the change in active material 16, such as a latch, lock, stop and/or the like. Upon release of the means, the active grille 10 reverts back to the original at least one feature. The illustrated active grille 10 is exemplary only and is not intended to be limited to any particular shape, size, dimension or configuration, material, or the like. For example, the blades can be oriented vertically or horizontally depending on the desired application. Likewise, the active material actuator can be vertically or horizontally aligned with the blades to effect movement thereof. In another embodiment, the operation of a separate actuator arranged in antagonistic manner with the active material 16 is used rather than a biasing spring to return the active grille 10 to the original at least one feature.

In another embodiment, the active grille 10 includes at least one sensor 26 in operative communication with the active grille 10 and/or the active material 16, wherein the sensor is adapted to transmit signals indicative of at least one vehicle condition. This embodiment may further comprise a controller 22 that is operatively connected to the sensor 24 and activation device 20, wherein the controller is programmed and configured to cause the activation device 20 to provide an activation signal to the active material 16 when the sensor 24 signals indicate a predetermined vehicle condition, e.g., temperature of a fuel cell or a radiator cooling system.

Figure 3A:
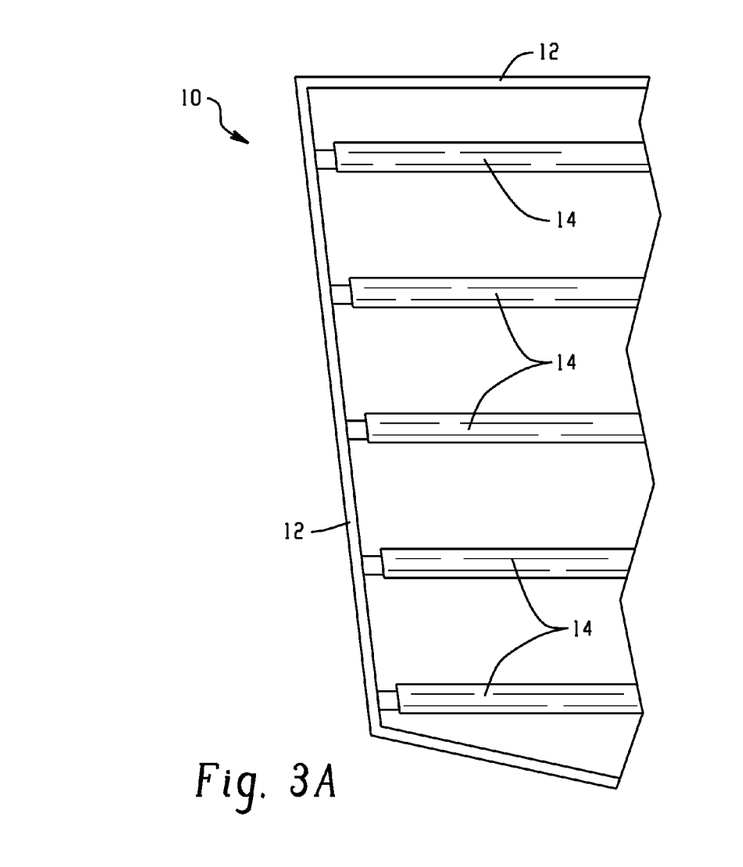
FIG. 3 is a partial perspective view of the active grille in the open and closed positions.
Figure 3B:
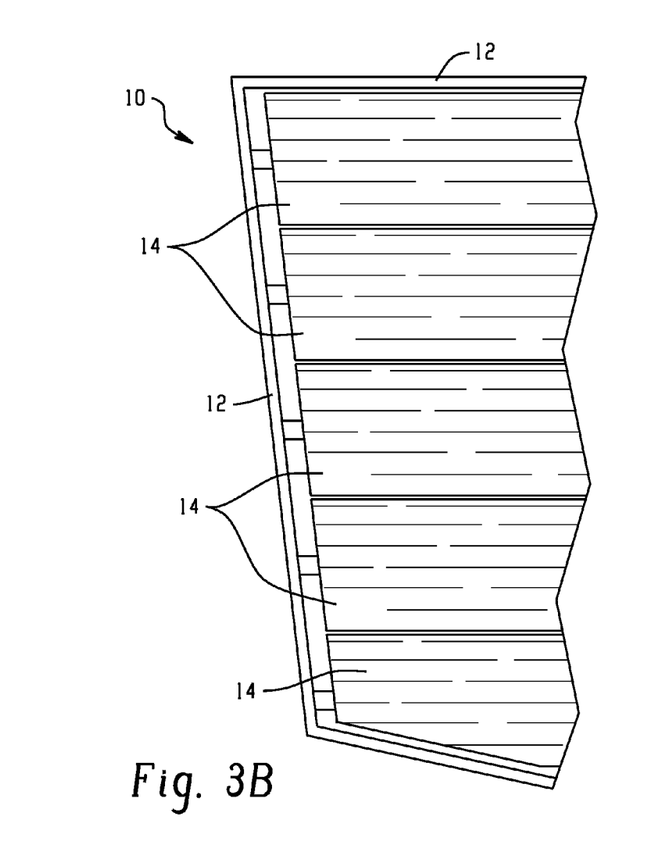
Figure 4A:
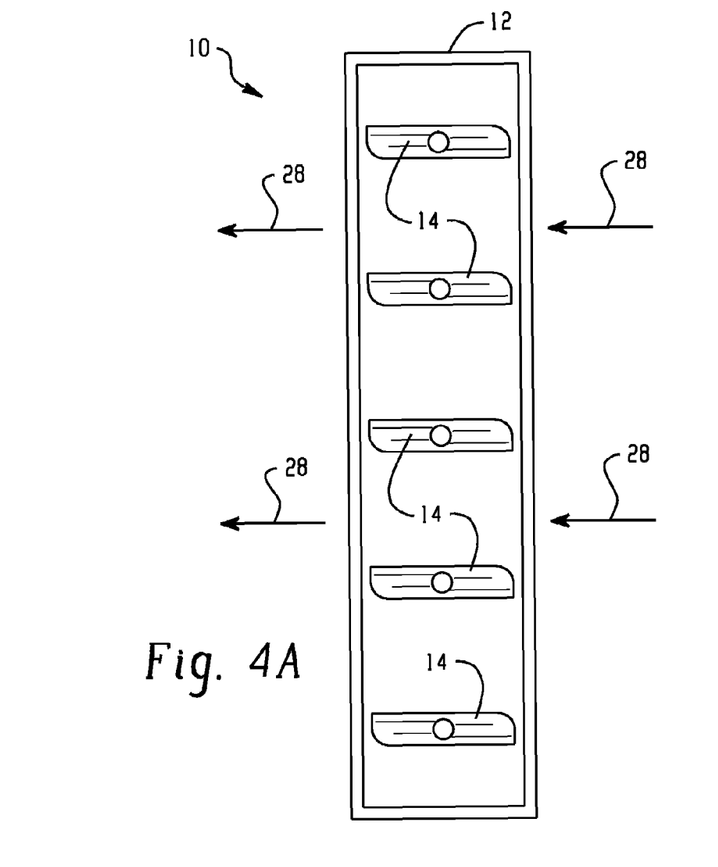
FIG. 4 is a side cross sectional view of the active grille of FIG. 3.
Figure 4B:
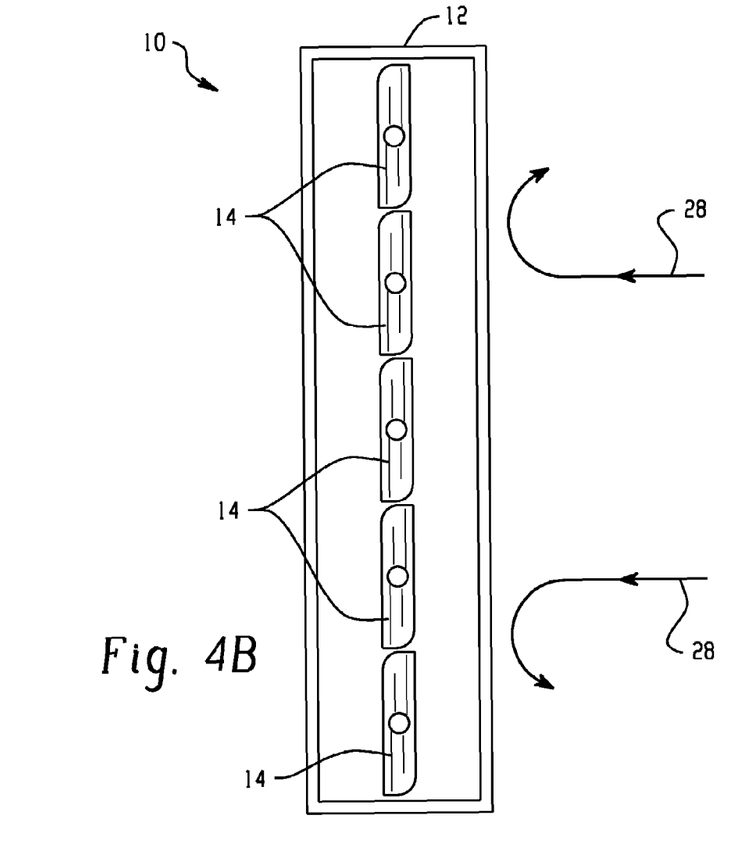

FIGS. 3 and 4 illustrate various views of the active grille in the open and closed positions. Airflow through the active grille 10 (as indicated by arrows 28 in FIG. 4) is regulated by selectively positioning the blades from a fully closed position to an opened position. It should be noted that the active grille can be configured to incorporate one or more distinct active material actuators so as to permit one or all of the blades to selectively open and/or close.

The blade 14 (also referred to herein as an air deflecting body) may be any of a variety of materials and configurations that enable the active grille 10 to function. Included are grille blades that span the whole height or width of the physical grille. Also included are grille blades broken into multiple separate elements that individually span only a portion such as half of the physical opening. This approach would be one which would allow more efficient/effective spanning of a highly curved grille geometry by allowing smaller "crescent shaped" grille elements whose axes of rotation were shorter chords, i.e. the greater the number of chord sections spanning an arc the smaller the arc (curvature) of each. An example is the splitting of a horizontal blade grille into two sections with the split line down the horizontal middle of the global opening. A single vertical rack in the middle could be used to simultaneously control both right and left portions. Alternatively individual vertical racks at each outside edge or dual racks in the middle could be used to provide separate activation of right and left hand portions. In addition, it is contemplated that special hydrophobic coatings (including nano-based) can be used for the grille blades as an approach for minimizing both the frequency of instances of grille coating and clogging with snow/ice/mud as well as the grille opening force (that required to break loose the coating/clog) when they do exist.

For example, in terms of rigid displacement approaches, rotating, local sliding, and global sliding approaches are proposed. A second class is when an externally connected active material is used to bend or otherwise deform a flexible element of the grille in so doing altering the opening geometry. A third class of embodiments is that in which the active material is embedded within a flexible element of the grille and its actuation causes a change in the grille geometry and opening size. A fourth class of embodiments is that in which the active material constitutes the element of the grille and its actuation causes a change in the grille geometry and opening size. A fifth class of embodiments is that in which one of the above four classes of approaches is used to activate an element separate from but possibly attached to the grille, activation of this element—such as a flap—causing the element to cover one or more openings in the grille. Among alternatives included in this disclosure are a complete drop in replacement active grille unit to be substituted for a current passive grille, and an active unit that drops in snug against the back of a passive grille, which backing unit contains the active closure elements, i.e., a retrofit grille.

Figure 5A:
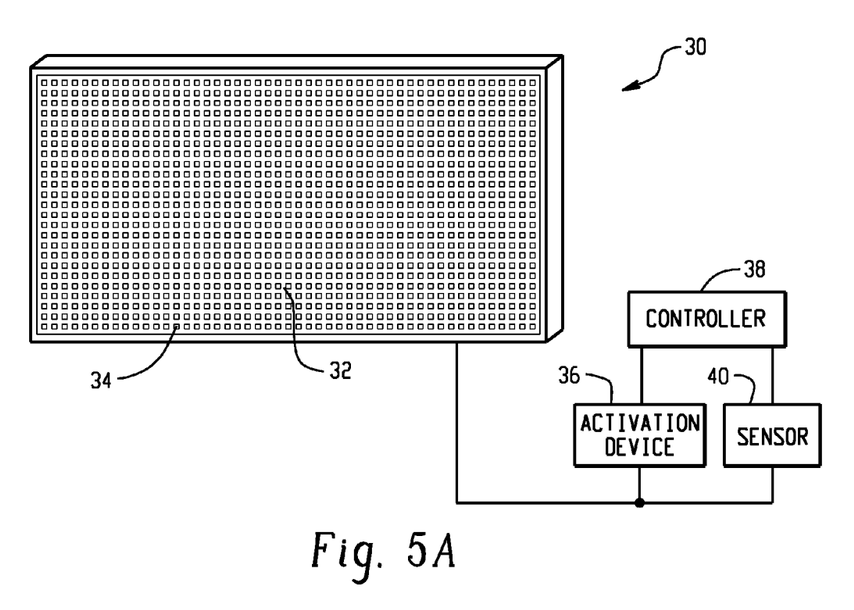
FIG. 5 is a perspective view of blade for use in the active grille, wherein the blade has at least a portion formed of an active material in accordance with an embodiment of the present disclosure.
Figure 5B:
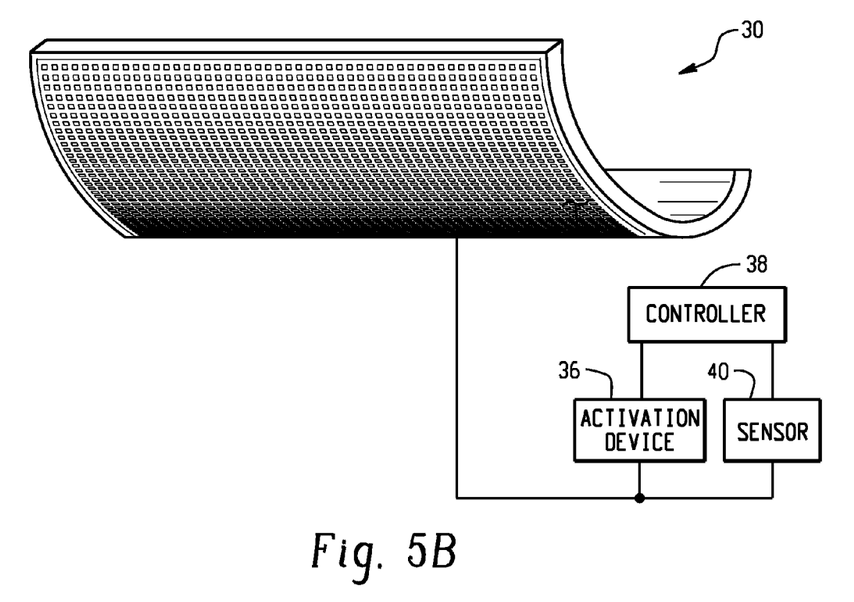

In FIGS. 5A and 5B, the blade 30 is comprised of a flexible material that exhibits adequate flexibility to operate as an adjustable active grille disposed within an elastic or flexile material 34 as the active material 32 changes at least one attribute. For example, the blade 30 may comprise at least a portion formed of the active material 16 as shown in the form of a grid. The active materials 32 may have a substantially straight shape at a first temperature (FIG. 5a) and a curved shape (i.e. curvilinear shape as shown in FIG. 5b) when heated above a phase transformation temperature. An activation device 36 is coupled to the active material to provide selective activation. A controller 38 and sensor 40 can be programmed to control the activation device 36

Figure 6:
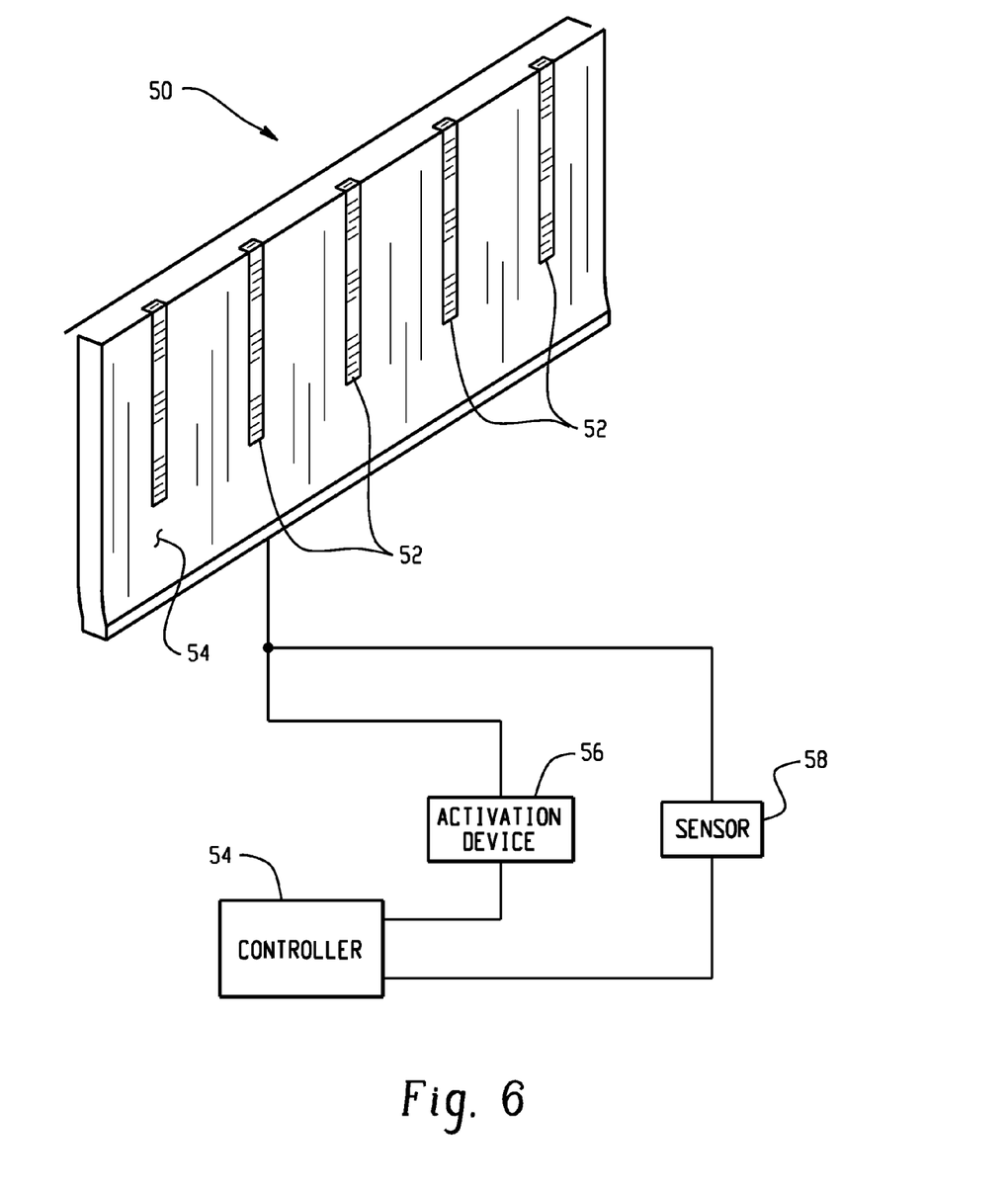
FIG. 6 is a perspective view of a blade for use in the active grille, wherein the blade has at least a portion formed of an active material in accordance with another embodiment of the present disclosure.

As shown in FIG. 6, a perspective view of a blade 50 is shown, having strips and/or sections of active material 52 embedded on or in a flexible matrix material 54. The placement of the active material 52 is not limited to any particular configuration or pattern and will be determined by the desired application of the grille. In one embodiment, as in strips of SMA, the active material 52 has a trained curved shape in the austenite phase, not shown in this view. At standing or low vehicle speeds, the active material 52 may be heated through resistance heating or passively through engine heat which may cause the active material 52 to curve and in doing so permit airflow through the grille. The change in shape may be initiated by an activation signal transmitted by activation device 54, controller 56, and/or sensor 58.

As a result of the phase change in the shape memory alloy, the stiffness of the blade will be greater than in the martensite phase. The number and size of the embedded active material strips may be chosen such that when in the austenite phase the embedded active material 52 causes the bulk of the active grille blades 50 to deform. However, when the SMA material is in the martensite phase, the flexible material comprising the bulk of the blades 50 is sufficiently stiff to return the device grille blade to a straight, deployed configuration, and in doing so straightening the active material 52. At higher speeds, in excess of a predetermined vehicle speed, the current flow causing resistant heating may be stopped, causing the active material 52 to return to the martensite phase. In this manner, the active grille blades 50 revert to a straightened deployed state, thereby preventing airflow through the active grille. Advantageously the blades 50 may be restored if deformed as a result of force, such as an impact, due to plastic deformation of the strips of active material 52 by heating the active material 52 to the austenite phase temperature.

Figure 7:
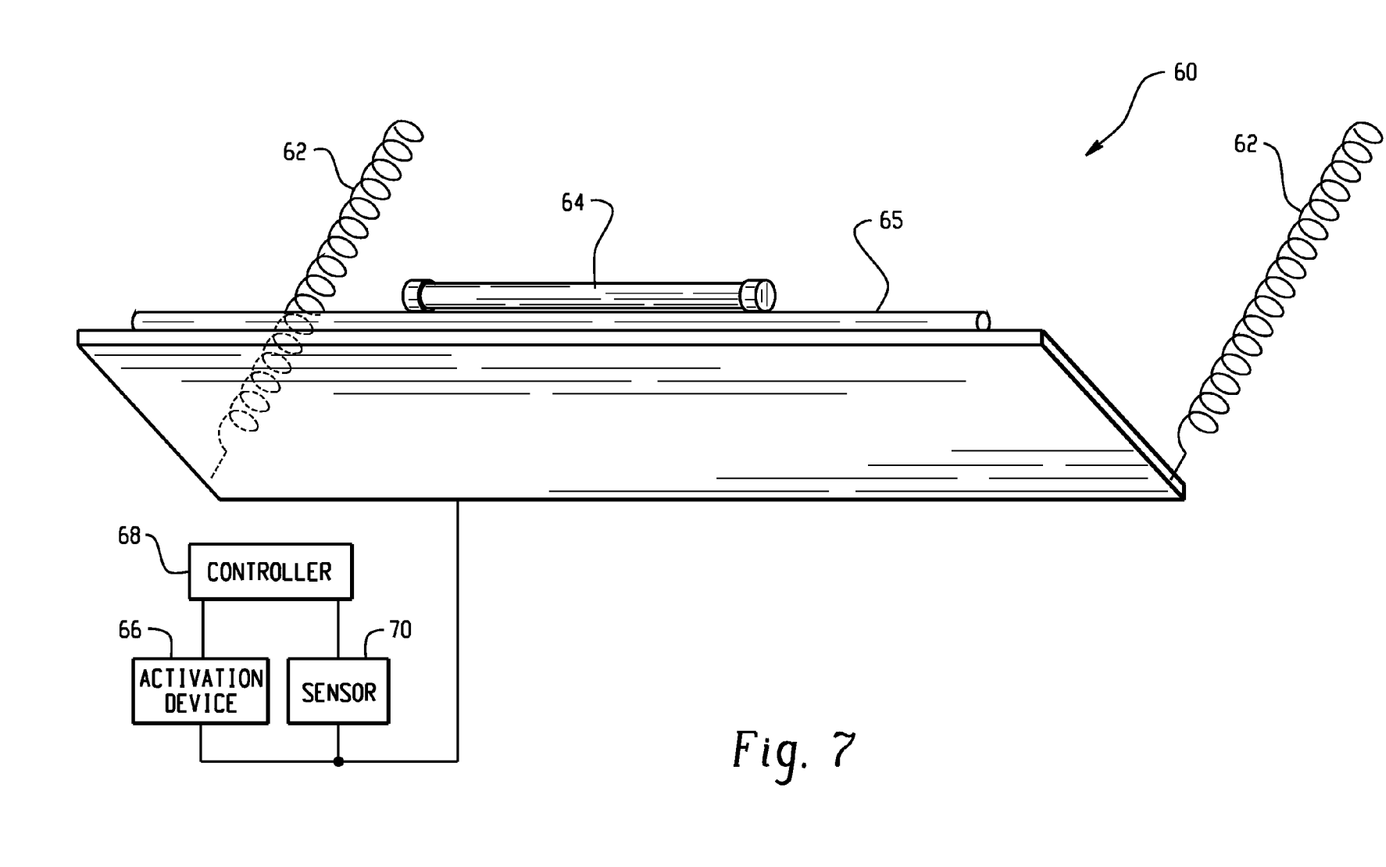
FIG. 7 is a perspective view of a blade for use in the active grille, wherein the blade has at least a portion formed of an active material in accordance with yet another embodiment of the present disclosure.

In an additional embodiment, shown in FIG. 7, a perspective view of a blade 60 comprises active material 62 in the shape of helical springs positioned in functional operation. In this embodiment, the active material 62 may be connected externally either directly or remotely to a surface of the blade 60. The blade 60 is coupled with a hollow tube 64 in such a fashion that the tube 64 is free to rotate about its axis. A spring mechanism 65 and the active material 62 are both coupled to the tube 64 in an opposing fashion such that their respective tensions balance each other. In this manner, the rotation of the tube 64 through external means may increase the tension in one direction while reducing tension in the other direction. At low vehicle speeds (i.e., less than a predetermined speed), tension in the spring mechanism 65 combined with reduced stiffness and greater length of an unheated active material 62 results in rotation of the blade 60. At higher speeds (i.e., greater than the predetermined speed), the temperature of the active material 62 can be raised through resistance heating or conductive heating to produce a phase change in the active material 62 from the martensite phase to the austenite phase. The wires comprised of active material 62 preferably exhibit up to about a 4 percent (%) reduction in length with an up to 3 times increase in stiffness properties. In this manner, the combined reduction in length and increase in stiffness properties can result in rotation of the blade 60, i.e., rotation of the tube 64 and stretching of the counter-balancing spring mechanism 65. Upon discontinuation of the resistance heating, the active material 62 cools to the martensite phase and the stretched spring mechanism 65 can be used to return the blade to its original position. In another embodiment, the change in one or more attribute of the active material 62 and/or position of the blade 60 may remain upon discontinuing the activation signal. In this embodiment, the blade 60 includes a means to maintain the change in active material 62, such as a latch, lock, stop and/or the like. Upon release of the means to maintain the change in active material 62, the blade 60 reverts back to the original position. As previously discussed, the activation device 66, controller 68 and/or sensor 70 may function with each other and the blade 60 to initiate the changes in at least one attribute of the active material 62 and positioning of the blade.

As noted above, the blades 14, 30, 50, 60 that define the grille 10 in any of the embodiments discussed above can move between two positions—fully open and fully closed; can move between multiple discrete degrees of opening between full and closed; or the opening and closing of different ones of multiple active elements are controlled individually or in groups. As such, lateral and/or vertical movement of closure blades is used to close/open either vertical or lateral grille opening.

The active material in any of the embodiments discussed above includes those compositions that can exhibit a change in stiffness properties, shape and/or dimensions in response to the activation signal, which can take the type for different active materials, of electrical, magnetic, thermal and like fields. The activation signal can be passive or active. That is, the activation signal can be actively applied to the shape memory material such as by application of a current to a resistive wire in operative communication with the shape memory material or may be indirectly applied, such as by immersion in an engine coolant, immersion in the operating temperatures of the vehicle, and the like. Preferred active materials include but are not limited to the class of shape memory materials, and combinations thereof. Shape memory materials generally refer to materials or compositions that have the ability to remember their original at least one attribute such as shape, which can subsequently be recalled for different of these materials by either the application or discontinuation of an external stimulus, as will be discussed in detail herein. As such, deformation from the original shape is a temporary condition. In this manner, the different shape memory materials can change to the trained shape in response to either the application or removal of an activation signal.

Suitable active materials for the active material based grille include, without limitation, shape memory alloys ("SMAs"; e.g., thermal and stress activated shape memory alloys and magnetic shape memory alloys (MSMA)), electroactive polymers (EAPs) such as dielectric elastomers, ionic polymer metal composites (IPMC), piezoelectric materials (e.g., polymers, ceramics), and shape memory polymers (SMPs), shape memory ceramics (SMCs), baroplastics, magnetorheological (MR) materials (e.g., fluids and elastomers), electrorheological (ER) materials (e.g., fluids, and elastomers), composites of the foregoing active materials with non-active materials, systems comprising at least one of the foregoing active materials, and combinations comprising at least one of the foregoing active materials. For convenience and by way of example, reference herein will be made to shape memory alloys and shape memory polymers. The shape memory ceramics, baroplastics, and the like, can be employed in a similar manner. For example, with baroplastic materials, a pressure induced mixing of nanophase domains of high and low glass transition temperature (Tg) components effects the shape change. Baroplastics can be processed at relatively low temperatures repeatedly without degradation. SMCs are similar to SMAs but can tolerate much higher operating temperatures than can other shape-memory materials. An example of an SMC is a piezoelectric material.

The ability of shape memory materials to return to their original shape upon the application or removal of external stimuli has led to their use in actuators to produce force/apply force resulting in desired motion. Active material actuators offer the potential for a reduction in actuator size, weight, volume, cost, noise and an increase in robustness in comparison with traditional electromechanical and hydraulic means of actuation. Ferromagnetic SMA's, for example, exhibit rapid dimensional changes of up to several percent in response to (and proportional to the strength of) an applied magnetic field. However, these changes are one-way changes and use the application of either a biasing force or a field reversal to return the ferromagnetic SMA to its starting configuration.

Shape memory alloys are alloy compositions with at least two different temperature-dependent phases or polarity. The most commonly utilized of these phases are the so-called martensite and austenite phases. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature (As). The temperature at which this phenomenon is complete is often called the austenite finish temperature (Af). When the shape memory alloy is in the austenite phase and is cooled, it begins to change into the martensite phase, and the temperature at which this phenomenon starts is often referred to as the martensite start temperature (Ms). The temperature at which austenite finishes transforming to martensite is often called the martensite finish temperature (Mf). The range between As and Af is often referred to as the martensite-to-austenite transformation temperature range while that between Ms and Mf is often called the austenite-to-martensite transformation temperature range. It should be noted that the above-mentioned transition temperatures are functions of the stress experienced by the SMA sample. Generally, these temperatures increase with increasing stress. In view of the foregoing properties, deformation of the shape memory alloy is preferably at or below the austenite start temperature (at or below As). Subsequent heating above the austenite start temperature causes the deformed shape memory material sample to begin to revert back to its original (non-stressed) permanent shape until completion at the austenite finish temperature. Thus, a suitable activation input or signal for use with shape memory alloys is a thermal activation signal having a magnitude that is sufficient to cause transformations between the martensite and austenite phases.

The temperature at which the shape memory alloy remembers its high temperature form (i.e., its original, non-stressed shape) when heated can be adjusted by slight changes in the composition of the alloy and through thermo-mechanical processing. In nickel-titanium shape memory alloys, for example, it can be changed from above about 100° C. to below about −100° C. The shape recovery process can occur over a range of just a few degrees or exhibit a more gradual recovery over a wider temperature range. The start or finish of the transformation can be controlled to within several degrees depending on the desired application and alloy composition. The mechanical properties of the shape memory alloy vary greatly over the temperature range spanning their transformation, typically providing shape memory effect and superelastic effect. For example, in the martensite phase a lower elastic modulus than in the austenite phase is observed. Shape memory alloys in the martensite phase can undergo large deformations by realigning the crystal structure arrangement with the applied stress. The material will retain this shape after the stress is removed. In other words, stress induced phase changes in SMA are two-way by nature; application of sufficient stress when an SMA is in its austenitic phase will cause it to change to its lower modulus martensitic phase. Removal of the applied stress will cause the SMA to switch back to its austenitic phase, and in so doing, recovering its starting shape and higher modulus. The mechanical properties of the shape memory alloy vary greatly over the temperature range spanning their transformation, typically providing the grille blades with shape memory effects, superelastic effects, and high damping capacity.

Exemplary shape memory alloy materials include nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and so forth. The alloys can be binary, ternary, or any higher order so long as the alloy composition exhibits a shape memory effect, e.g., change in shape, orientation, yield strength, flexural modulus, damping capacity, superelasticity, and/or similar properties. Selection of a suitable shape memory alloy composition depends, in part, on the temperature range of the intended application.

The recovery to the austenite phase at a higher temperature is accompanied by very large (compared to those needed to deform the material), which can be as high as the inherent yield strength of the austenite material, sometimes up to three or more times that of the deformed martensite phase. For applications that require a large number of operating cycles, a strain of less than or equal to 4% or so of the deformed length of wire used can be obtained. In experiments performed with shape memory alloy wires of 0.5 millimeter (mm) diameter, the maximum strain in the order of 4% was obtained. This percentage can increase up to 8% for thinner wires or for applications with a low number of cycles.

MSMAs are alloys, often composed of Ni—Mn—Ga, that change shape due to strain induced by a magnetic field. MSMAs have internal variants with different magnetic and crystallographic orientations. In a magnetic field, the proportions of these variants change, resulting in an overall shape change of the material. An MSMA actuator generally requires that the MSMA material be placed between coils of an electromagnet. Electric current running through the coil induces a magnetic field through the MSMA material, causing a change in shape.

As previously mentioned, other exemplary shape memory materials are shape memory polymers (SMPs). "Shape memory polymer" generally refers to a polymeric material, which exhibits a change in a property, such as a modulus, a dimension, a coefficient of thermal expansion, the permeability to moisture, an optical property (e.g., transmissivity), or a combination comprising at least one of the foregoing properties in combination with a change in its a microstructure and/or morphology upon application of an activation signal. Shape memory polymers can be thermoresponsive (i.e., the change in the property is caused by a thermal activation signal delivered either directly via heat supply or removal, or indirectly via a vibration of a frequency that is appropriate to excite high amplitude vibrations at the molecular level which lead to internal generation of heat), photoresponsive (i.e., the change in the property is caused by an electromagnetic radiation activation signal), moisture-responsive (i.e., the change in the property is caused by a liquid activation signal such as humidity, water vapor, or water), chemo-responsive (i.e. responsive to a change in the concentration of one or more chemical species in its environment; e.g., the concentration of H+ ion—the pH of the environment), or a combination comprising at least one of the foregoing.

Generally, SMPs are phase segregated co-polymers comprising at least two different units, which can be described as defining different segments within the SMP, each segment contributing differently to the overall properties of the SMP. As used herein, the term "segment" refers to a block, graft, or sequence of the same or similar monomer or oligomer units, which are copolymerized to form the SMP. Each segment can be (semi-) crystalline or amorphous and will have a corresponding melting point or glass transition temperature (Tg), respectively. The term "thermal transition temperature" is used herein for convenience to generically refer to either a Tg or a melting point depending on whether the segment is an amorphous segment or a crystalline segment. For SMPs comprising (n) segments, the SMP is said to have a hard segment and (n−1) soft segments, wherein the hard segment has a higher thermal transition temperature than any soft segment. Thus, the SMP has (n) thermal transition temperatures. The thermal transition temperature of the hard segment is termed the "last transition temperature", and the lowest thermal transition temperature of the so-called "softest" segment is termed the "first transition temperature". It is important to note that if the SMP has multiple segments characterized by the same thermal transition temperature, which is also the last transition temperature, then the SMP is said to have multiple hard segments.

When the SMP is heated above the last transition temperature, the SMP material can be imparted a permanent shape. A permanent shape for the SMP can be set or memorized by subsequently cooling the SMP below that temperature. As used herein, the terms "original shape", "previously defined shape", "predetermined shape", and "permanent shape" are synonymous and are intended to be used interchangeably. A temporary shape can be set by heating the material to a temperature higher than a thermal transition temperature of any soft segment yet below the last transition temperature, applying an external stress or load to deform the SMP, and then cooling below the particular thermal transition temperature of the soft segment while maintaining the deforming external stress or load.

The permanent shape can be recovered by heating the material, with the stress or load removed, above the particular thermal transition temperature of the soft segment yet below the last transition temperature. Thus, it should be clear that by combining multiple soft segments it is possible to demonstrate multiple temporary shapes and with multiple hard segments it can be possible to demonstrate multiple permanent shapes. Similarly using a layered or composite approach, a combination of multiple SMPs will demonstrate transitions between multiple temporary and permanent shapes. While SMPs can be used variously in sheet, slab, fiber, or foam forms to adjust/control blade stiffness, they do have the downside that they require continuous power to remain in their lower modulus shape. They are thus better suited for reversible shape, position, and orientation setting of the blade (through heat/cool/reheat cycles) based on driving preferences.

The shape memory material may also comprise a piezoelectric material. Also, in certain embodiments, the piezoelectric material can be configured as an actuator for providing rapid deployment. As used herein, the term "piezoelectric" is used to describe a material that mechanically deforms (changes shape) when a voltage potential is applied, or conversely, generates an electrical charge when mechanically deformed. Piezoelectrics exhibit a small change in dimensions when subjected to the applied voltage, with the response being proportional to the strength of the applied field and being quite fast (capable of easily reaching the thousand hertz range). Because their dimensional change is small (e.g., less than 0.1%), to dramatically increase the magnitude of dimensional change they are usually used in the form of piezo ceramic unimorph and bi-morph flat patch actuators that are constructed so as to bow into a concave or convex shape upon application of a relatively small voltage. The morphing/bowing of such patches within the liner of the holder is suitable for grasping/releasing the object held.

One type of unimorph is a structure composed of a single piezoelectric element externally bonded to a flexible metal foil or strip, which is stimulated by the piezoelectric element when activated with a changing voltage and results in an axial buckling or deflection as it opposes the movement of the piezoelectric element. The actuator movement for a unimorph can be by contraction or expansion. Unimorphs can exhibit a strain of as high as about 10%, but generally can only sustain low loads relative to the overall dimensions of the unimorph structure.

In contrast to the unimorph piezoelectric device, a bimorph device includes an intermediate flexible metal foil sandwiched between two piezoelectric elements. Bimorphs exhibit more displacement than unimorphs because under the applied voltage one ceramic element will contract while the other expands. Bimorphs can exhibit strains up to about 20%, but similar to unimorphs, generally cannot sustain high loads relative to the overall dimensions of the unimorph structure.

Exemplary piezoelectric materials include inorganic compounds, organic compounds, and metals. With regard to organic materials, all of the polymeric materials with noncentrosymmetric structure and large dipole moment group(s) on the main chain or on the side-chain, or on both chains within the molecules, can be used as candidates for the piezoelectric film. Examples of polymers include poly(sodium 4-styrene-sulfonate) ("PSS"), poly(Poly(vinylamine) backbone azo chromophore), and their derivatives; polyfluorocarbines, including polyvinylidene fluoride ("PVDF"), its co-polymer vinylidene fluoride ("VDF"), trifluorethylene (TrFE), and their derivatives; polychlorocarbons, including poly(vinylchloride) ("PVC"), polyvinylidene chloride ("PVC2"), and their derivatives; polyacrylonitriles ("PAN"), and their derivatives; polycarboxylic acids, including poly (methacrylic acid ("PMA"), and their derivatives; polyureas, and their derivatives; polyurethanes ("PUE"), and their derivatives; bio-polymer molecules such as poly-L-lactic acids and their derivatives, and membrane proteins, as well as phosphate bio-molecules; polyanilines and their derivatives, and all of the derivatives of tetraamines; polyimides, including Kapton® molecules and polyetherimide ("PEI"), and their derivatives; all of the membrane polymers; poly (N-vinyl pyrrolidone) ("PVP") homopolymer, and its derivatives, and random PVP-co-vinyl acetate ("PVAc") copolymers; and all of the aromatic polymers with dipole moment groups in the main-chain or side-chains, or in both the main-chain and the side-chains; as well as combinations comprising at least one of the foregoing.

Further, piezoelectric materials can include Pt, Pd, Ni, T, Cr, Fe, Ag, Au, Cu, and metal alloys comprising at least one of the foregoing, as well as combinations comprising at least one of the foregoing. These piezoelectric materials can also include, for example, metal oxide such as $SiO_2$, $Al_2O_3$, $ZrO_2$, $TiO_2$, $SrTiO_3$, $PbTiO_3$, $BaTiO_3$, $FeO_3$, $Fe_3O_4$, ZnO, and combinations comprising at least one of the foregoing; and Group VIA and IIB compounds, such as CdSe, CdS, GaAs, $AgCaSe_2$, ZnSe, GaP, InP, ZnS, and combinations comprising at least one of the foregoing.

Exemplary shape memory materials also comprise magnetorheological (MR) and ER polymers. MR polymers are suspensions of micrometer-sized, magnetically polarizable particles (e.g., ferromagnetic or paramagnetic particles as described below) in a polymer (e.g., a thermoset elastic polymer or rubber). Exemplary polymer matrices include poly-alpha-olefins, natural rubber, silicone, polybutadiene, polyethylene, polyisoprene, and combinations comprising at least one of the foregoing.

The stiffness and potentially the shape of the polymer structure are attained by changing the shear and compression/tension moduli by varying the strength of the applied magnetic field. The MR polymers typically develop their structure when exposed to a magnetic field in as little as a few milliseconds, with the stiffness and shape changes being proportional to the strength of the applied field. Discontinuing the exposure of the MR polymers to the magnetic field reverses the process and the elastomer returns to its lower modulus state.

Electronic electroactive polymers (EAPs) are a laminate of a pair of electrodes with an intermediate layer of low elastic modulus dielectric material. Applying a potential between the electrodes squeezes the intermediate layer causing it to expand in plane. They exhibit a response proportional to the applied field and can be actuated at high frequencies. EAP morphing laminate sheets have been demonstrated. Their major downside is that they require applied voltages approximately three orders of magnitude greater than those required by piezoelectrics Electroactive polymers include those polymeric materials that exhibit piezoelectric, pyroelectric, or electrostrictive properties in response to electrical or mechanical fields. An example of an electrostrictive-grafted elastomer with a piezoelectric poly(vinylidene fluoride-trifluoro-ethylene) copolymer. This combination has the ability to produce a varied amount of ferroelectric-electrostrictive molecular composite systems.

Materials suitable for use as an electroactive polymer may include any substantially insulating polymer and/or rubber that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties (e.g., copolymers comprising silicone and acrylic moieties, polymer blends comprising a silicone elastomer and an acrylic elastomer, and so forth).

Materials used as an electroactive polymer can be selected based on material propert(ies) such as a high electrical breakdown strength, a low modulus of elasticity (e.g., for large or small deformations), a high dielectric constant, and so forth. In one embodiment, the polymer can be selected such that is has an elastic modulus of less than or equal to about 100 MPa. In another embodiment, the polymer can be selected such that is has a maximum actuation pressure of about 0.05 megaPascals (MPa) and about 10 MPa, or, more specifically, about 0.3 MPa to about 3 MPa. In another embodiment, the polymer can be selected such that is has a dielectric constant of about 2 and about 20, or, more specifically, about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers can be fabricated and implemented as thin films, e.g., having a thickness of less than or equal to about 50 micrometers.

As electroactive polymers may deflect at high strains, electrodes attached to the polymers should also deflect without compromising mechanical or electrical performance. Generally, electrodes suitable for use can be of any shape and material provided that they are able to supply a suitable voltage to, or receive a suitable voltage from, an electroactive polymer. The voltage can be either constant or varying over time. In one embodiment, the electrodes adhere to a surface of the polymer. Electrodes adhering to the polymer can be compliant and conform to the changing shape of the polymer. The electrodes can be only applied to a portion of an electroactive polymer and define an active area according to their geometry. Various types of electrodes include structured electrodes comprising metal traces and charge distribution layers, textured electrodes comprising varying out of plane dimensions, conductive greases (such as carbon greases and silver greases), colloidal suspensions, high aspect ratio conductive materials (such as carbon fibrils and carbon nanotubes, and mixtures of ionically conductive materials), as well as combinations comprising at least one of the foregoing.

Exemplary electrode materials can include graphite, carbon black, colloidal suspensions, metals (including silver and gold), filled gels and polymers (e.g., silver filled and carbon filled gels and polymers), and ionically or electronically conductive polymers, as well as combinations comprising at least one of the foregoing. It is understood that certain electrode materials may work well with particular polymers and may not work as well for others. By way of example, carbon fibrils work well with acrylic elastomer polymers while not as well with silicone polymers.

Magnetostrictives are solids that develop a large mechanical deformation when subjected to an external magnetic field. This magnetostriction phenomenon is attributed to the rotations of small magnetic domains in the materials, which are randomly oriented when the material is not exposed to a magnetic field. The shape change is largest in ferromagnetic or ferromagnetic solids (e.g., Terfenol-D). These materials possess a very fast response capability, with the strain proportional to the strength of the applied magnetic field, and they return to their starting dimension upon removal of the field. However, these materials have maximum strains of about 0.1 to about 0.2 percent.

The active grilles and methods of the present disclosure are able to adjust blades features such as shape, dimension, stiffness, location, combinations thereof, and the like by changing the at least one attribute of active material to match the needs of different driving conditions. Changes in at least one attribute of active material 16 include shape, dimension, stiffness, combinations thereof and the like. Utilizing active materials to effect these changes provides an active grille of increased simplicity and robustness, while reducing the number of failure modes, device volume and energy requirements for activation due to higher energy densities.

Unless otherwise indicated, all numbers expressing quantities of ingredients, properties such as molecular weight, reaction conditions, and so forth used in the specification and claims are to be understood as being modified in all instances by the term "about". Accordingly, unless indicated to the contrary, the numerical parameters set forth in the following specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

The active grille for regulating airflow can be used for controlling airflow through and/or across a radiator, a fuel cell compartment, a fuel cell, and/or engine compartment in a vehicle. However, it should be understood that the grille can be configured and adapted for use in other parts of the vehicle such as, but not intended to be limited to, airflow control over the transmission housing, the air conditioner heat exchanger, the brakes, through wheel openings, and the like.

Elements of the control logic include, but are not limited to, the following: opening/closing dictated by vehicle speed; force limit control on the actuation mechanism to protect against overload due to jamming or locking by debris, icing, etc.; manual button controlled opening and closing operation; physical designs of the moving elements with localized tip flexibility to avoid finger pinching etc.; logic indicating that closing could only occur when engine is running and car is in gear and/or the car is in gear and moving; use of a multiple wire bundle for actuation in which only a limited number of wires would be used when vehicle stationary so that finger pinching loads would be limited to safe margins; all wires would be activated when vehicle was at velocity; logic that the grille would be open when the vehicle was parked and the temperature below freezing to avoid grille freezing shut; using an available signal such as the temperature of the coolant, the temperature in the engine compartment, etc. to control opening and closing of the grille; logic that the grille would be closed when the vehicle was parked and the temperature below (potentially well below) freezing to avoid engine cooling off so quickly; logic that the grille be initially closed in any vehicle operation cycle until the engine heats up to allow more rapid heating and accompanying potential reduction in emission; and including a passive safety override mechanism (based on the shape memory of SMA) to cause automatic opening when excessive temperatures are reached in the region in which the passive is located.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best mode contemplated for carrying out this invention, but that the invention will include all embodiments falling within the scope of the appended claims.

What is claimed is:

1. An active grille positioned for selectively controlling fluid flow, comprising:
   a blade pivotably mounted to a frame;
   an active material in operative communication with the blade, the active material being operative to change at least one attribute in response to an activation signal, wherein the fluid flow through the grille changes with the change in the at least one attribute of the active material; and
   a force limit control coupled to the activation device configured to protect against an overload.

2. The active grille of claim 1, wherein the blade is formed of the active material.

3. The active grille of claim 1, wherein the blade is formed at least in part of the active material.

4. The active grille of claim 1, wherein the active material comprises a shape memory alloy, an electroactive polymer, an ionic polymer metal composite, a piezoelectric material, a shape memory polymer, a shape memory ceramic, a magnetorheological material, an electrorheological material, an electrostrictive material, a magnetostrictive material, a composite of at least one of the foregoing active materials with a non-active material, and a combination comprising at least one of the foregoing active materials.

5. The active grille of claim 1, wherein the activation signal comprises a thermal activation signal, an electric activation signal, a magnetic activation signal, a chemical activation signal, a mechanical load, or a combination comprising at least one of the foregoing activation signals.

6. The active grille of claim 1, further comprising an activation device configured to provide the activation signal to the active material.

7. The active grille of claim 1, further comprising a controller operatively coupled to an activation device configured to provide the activation signal to the active material.

8. The active grille of claim 1, wherein the change in the at least one property comprises a change in a shape, a dimension, a phase, a shape orientation, a stiffness, a shear strength and/or viscosity or combinations comprising at least one of the foregoing properties.

9. The active grille of claim 1, further comprising a bias spring to configured to restore the blade to the first position.

10. The active grille of claim 1, further comprising means for maintaining position of the blade upon discontinuation of the action signal.

11. The active grille of claim 1, wherein the blade is coupled to an active material actuator configured to pivot the blade to an open or closed position.

12. The active grille of claim 11, wherein the active material based actuator is a wire formed to the active material having one end attached to the blade and another end attached to a stationary surface.

13. The active grille of claim 1, further comprising a sensor configured to detect a predetermined vehicle condition.

* * * * *